(12) United States Patent
Coni et al.

(10) Patent No.: US 10,025,109 B2
(45) Date of Patent: Jul. 17, 2018

(54) STEREOSCOPIC VISUAL DISPLAY SYSTEM WITH ACTIVE WAVELENGTH MULTIPLEXING

(71) Applicant: THALES, Courbevoie (FR)

(72) Inventors: Philippe Coni, Saint Jean d'Illac (FR); Matthieu Grossetete, Cenon (FR); Aude Gueguen, Bordeaux (FR)

(73) Assignee: Thales, Courbevoie (FR)

( * ) Notice: Subject to any disclaimer, the term of this patent is extended or adjusted under 35 U.S.C. 154(b) by 156 days.

(21) Appl. No.: 14/927,422

(22) Filed: Oct. 29, 2015

(65) Prior Publication Data
US 2016/0124234 A1 May 5, 2016

(30) Foreign Application Priority Data
Oct. 31, 2014 (FR) ..................................... 14 02462

(51) Int. Cl.
*G02B 27/22* (2018.01)
*G02B 26/00* (2006.01)
(Continued)

(52) U.S. Cl.
CPC ........... *G02B 27/2207* (2013.01); *G02B 5/28* (2013.01); *G02B 26/007* (2013.01);
(Continued)

(58) Field of Classification Search
CPC .................................................. G02B 27/2207
(Continued)

(56) References Cited

U.S. PATENT DOCUMENTS

2002/0019720 A1* 2/2002 Wei Wei ................ G01C 23/00
702/151
2006/0098093 A1 5/2006 Hahn et al.
(Continued)

FOREIGN PATENT DOCUMENTS

DE 102 49 815 A1 5/2004
JP S62-22034 A 1/1987
(Continued)

OTHER PUBLICATIONS

French Search Report for corresponding French Patent Application No. 1402462, 9 pp., (dated Jul. 31, 2015).
(Continued)

*Primary Examiner* — Chikaodili E Anyikire
*Assistant Examiner* — Shanika Brumfield
(74) *Attorney, Agent, or Firm* — Womble Bond Dickinson (US) LLP

(57) ABSTRACT

Visual display systems are described having means for generating stereoscopic images, a device for visual display of said stereoscopic images having a projector and a semi-transparent screen; and a pair of stereoscopic spectacles. The projector according to the invention has an imager and an interference filter, the spectral transmission of which has at least one transmission band of determined width centerd around a wavelength, said wavelength being dependent on the incidence of the light on said interference filter. The projector has means allowing the angular position of the filter to be varied between two determined positions so as to transmit, according to the position, either a first spectral band or a second spectral band. The pair of stereoscopic spectacles has a first lens transmitting the first spectral band and blocking the second spectral band and a second lens providing the opposite function.

8 Claims, 5 Drawing Sheets

(51) Int. Cl.
 G02B 27/01 (2006.01)
 G03B 35/26 (2006.01)
 G02B 5/28 (2006.01)
 H04N 13/04 (2006.01)
(52) U.S. Cl.
 CPC ..... *G02B 27/0101* (2013.01); *G02B 27/0179* (2013.01); *G02B 27/2264* (2013.01); *G03B 35/26* (2013.01); *H04N 13/0431* (2013.01); *H04N 13/0459* (2013.01); *H04N 13/0468* (2013.01); *G02B 26/001* (2013.01); *G02B 2027/014* (2013.01); *G02B 2027/0112* (2013.01); *G02B 2027/0114* (2013.01); *G02B 2027/0134* (2013.01); *G02B 2027/0187* (2013.01)
(58) Field of Classification Search
 USPC ..................................................... 348/42–60
 See application file for complete search history.

(56) References Cited

U.S. PATENT DOCUMENTS

| | | | | |
|---|---|---|---|---|
| 2007/0146880 | A1* | 6/2007 | Bleha | G02B 27/102 359/468 |
| 2010/0177171 | A1* | 7/2010 | Marcus | G02B 27/2264 348/53 |
| 2011/0102562 | A1* | 5/2011 | Johnson, Jr. | H04N 13/0422 348/58 |
| 2011/0102563 | A1* | 5/2011 | Johnson, Jr. | H04N 13/0431 348/60 |
| 2011/0205494 | A1* | 8/2011 | Richards | G02B 5/20 353/7 |
| 2013/0063816 | A1* | 3/2013 | Mathiassen | H04N 13/0431 359/464 |
| 2013/0127842 | A1* | 5/2013 | Lee | G06T 15/00 345/419 |
| 2013/0229448 | A1* | 9/2013 | Simon | G02B 27/2207 345/697 |
| 2013/0342904 | A1* | 12/2013 | Richards | H04N 13/0422 359/464 |
| 2014/0022637 | A1 | 1/2014 | Richards et al. | |
| 2014/0063207 | A1* | 3/2014 | Li | H04N 13/0404 348/51 |

FOREIGN PATENT DOCUMENTS

JP H03-197845 A 8/1991
WO WO 2008/140787 A2 11/2008

OTHER PUBLICATIONS

Junejei Huang, et al., "Spectral Multiplex 3D Cinema Projector", Proceedings of 3DSA2013, P5-1, 4 pp., (2013).

* cited by examiner

STEREOSCOPIC VISUAL DISPLAY SYSTEM WITH ACTIVE WAVELENGTH MULTIPLEXING

FIELD

The field of the invention is that of visual display systems allowing an image to be presented in a manner superimposed on the outside world. The technical applications are mainly assistance in vehicle driving. The invention applies quite particularly to the field of aircraft cockpits in which the pilot needs to see the outside and simultaneously have information about flight behaviour or navigation of the aircraft. The invention can also apply to all types of driving and control systems displaying symbols in a manner superimposed on a natural outside environment. This is the case, for example, of control towers or ship navigation stations. The outside environment can also be simulated. This is the case with flight simulators or with platforms for controlling and commanding drones.

BACKGROUND

There are various types of visual display systems allowing a synthetic image to be superimposed on an outside environment. One possible solution, which is shown in FIG. 1, involves implementing a stereoscopic image projector. The visual display system 10 then comprises:
- a projector 11 for stereoscopic images referred to as "3D" images that is capable of generating at least two images called "Right Eye"/"Left Eye" that represent one and the same object. In the case of FIG. 1, the object is a sphere S;
- a diffusing semitransparent screen 12 onto which the "Right Eye"/"Left Eye" images are projected;
- a pair of spectacles 13 having means for separating the "Right Eye"/"Left Eye" images and first detection means 14 and intended to be worn by a user;
- second detection means 15 linked to a fixed reference frame R, and, in association with the first detection means 14, allowing detection of the spatial position of the pair of spectacles 13 in this fixed reference frame;
- an electronic computer 16 comprising at least the following functions:
  - acquisition of the signals from the detection means 14 and/or 15 and computation of the position of the pair of spectacles;
  - computation of the position of the stereoscopic image corresponding to the position of the pair of spectacles;
  - computation of the two Right Eye/Left Eye images.

SUMMARY

There are various means for ensuring stereoscopic separation of the projected images.

In a first technical solution, temporal separation is used. The projector sequentially sends first the Right Eye image and then the left eye image in synchronized fashion. The spectacles are active and have active "shutters" synchronized to the projector. Thus, each eye sees the image that is intended for it and only this image. The shutters are generally produced on the basis of liquid crystal technology. This solution has several disadvantages.

Active spectacles require a power supply and control electronics, which gives rise to maintenance problems for onboard use. Moreover, the polarizers of LCD shutters cause darkening of the cockpit visual displays, possibly as far as total darkening, according to the various polarization directions and the inclination of the spectacles. Finally, the presence of polarizers and the alternation of left/right vision that is necessary for stereoscopic vision brings about a great loss of quantity of transmitted light. The transmission of the spectacles is then no greater than 30%, giving rise to crippling darkening of the outside landscape.

In a second technical solution, the stereoscopic projector operates in polarized mode. It successively and periodically transmits a Right Eye image according to a first polarization and a Left Eye image according to a second polarization, which is different from the first polarization. The pair of spectacles 13 is passive. It has a first polarized lens that is transparent to the first polarization and opaque to the second and a second polarized lens that is transparent to the second polarization and opaque to the first.

Polarizer spectacles are passive and solve the problem of alternate darkness in each eye, and also battery management. By contrast, it is absolutely necessary to use a projection screen that preserves the polarization. A silvered screen as used in cinemas allows this use but, not being transparent, is not suitable for the applications that the invention concerns.

In a third technical solution, the projector transmits two coloured images, the emission spectra of which are separate. The pair of spectacles has two different filters, the first transmitting the first spectrum and filtering the second spectrum. The second filter provides the opposite function. Thus, each eye sees one and only one coloured image and only this image. This technique is known by the name of anaglyph. The simplest way of producing an anaglyph is to separate the visible spectrum into two parts, one red and the other blue. The obvious advantage of the device is its great simplicity of implementation, but the vision of the outside world is greatly distorted.

With greater improvement, the so-called spectral multiplexing system separates the visible spectrum into two interleaved parts, one dedicated to each eye. Colour restoration is thus preserved better.

The tricky point with this type of system is generation of colour images with interleaved spectra by the image projector. Various technical solutions have been proposed.

The first solution involves placing in front of the image projector a wheel having two coloured filters, each filter dedicated to one image. The rotation of the coloured areas is synchronized to the images that are dedicated to each eye. The patent applications from the "Dolby Laboratories Licensing Corporation" company U.S. 2011/0205494, U.S. 2013/0342904 and U.S. 2014/0022637 describe solutions of this type for cinematographic applications that require neither levels of increased light nor, of course, of transmission of the outside landscape.

In one variant embodiment, the wheel having the coloured filters is integrated in the projector. The patent DE 10249815 from the Daimler Chrysler AG company describes a solution of this type. In both cases, these technical solutions require the use of a rotary element that necessarily has a certain bulk, which is not very compatible with onboard hardware.

A second solution involves modifying the internal optical path of the projector so as to pass alternately through a first coloured filter and then a second coloured filter. The publication "Spectral Multiplex 3D Cinema Projector, 3DSA2013 Proceedings P5-1" describes a solution of this type. This type of technical solution has several disadvantages. It requires a complex optical system having two different light paths and two different coloured filters. It is necessarily sensitive to external environments and goes wrong over time. Finally, it has a high cost.

The stereoscopic visual display system according to the invention does not have these disadvantages. It has a single coloured filter and is based on the spectral transmission properties of interference filters according to incidence. More precisely, the subject of the invention is a visual display system having means for generating stereoscopic images of a predetermined object, a visual display device for said stereoscopic images having a projector for stereoscopic images and a semitransparent screen, and a pair of stereoscopic spectacles, said projector having an imager, characterized in that:

the projector has:
an interference filter arranged in front of the imager, the spectral transmission of which has at least one transmission band of determined width centred around a wavelength, said wavelength being dependent on the incidence of the light on said interference filter, and;
means allowing the angular position of the filter to be varied between two determined positions so as to transmit, for the first position, a first spectral band and, for the second position, a second spectral band;
the pair of stereoscopic spectacles having a first lens transmitting the first spectral band and blocking the second spectral band and a second lens transmitting the second spectral band and blocking the first spectral band.

Advantageously, the projector has:
an interference filter, the spectral transmission of which has three transmission bands of determined width centred around three wavelengths, said wavelengths being dependent on the incidence of the light on said interference filter; and
means allowing the angular position of the filter to be varied between two determined positions so as to transmit, for the first position, three first spectral bands and, for the second position, three second spectral bands;
the pair of stereoscopic spectacles having a first lens transmitting the three first spectral bands and blocking the three second spectral bands and a second lens transmitting the three second spectral bands and blocking the three first spectral bands.

Advantageously, the determined angular positions of the interference filter are programmable according to the constraints of set-up of the visual display system.

Advantageously, the pair of spectacles has means of filtering that is common to the two lenses at one of the wavelengths transmitted by consumer laser pointers in classes 3A, 3B and 4.

Advantageously, the system has detection means for the relative position of the pair of spectacles in relation to the position of the semitransparent screen and means for computing the stereoscopic images so that the position of the stereoscopic image of the object is fixed in a predetermined reference frame and independent of the position of the stereoscopic spectacles.

Advantageously, the projector has a servocontrol system so that the determined angular positions of the interference filter are dependent on the relative position of the pair of spectacles in relation to the position of the semitransparent screen.

Advantageously, the predetermined distance is between a few centimeters and optical infinity.

Advantageously, the visual display system is an aircraft cockpit system.

BRIEF DESCRIPTION OF THE DRAWINGS

The invention will be better understood and other advantages will emerge upon reading the description that follows, which is provided without implying limitation and with reference to the appended figures, among which.

DETAILED DESCRIPTION

The device according to the invention is based on the optical properties of interference filters. An interference filter has a multitude of optical layers with a thickness close to the wavelength or to a fraction of a wavelength. The various reflections of a ray of light at a given wavelength on the various layers interfere with one another. The ray of light is then transmitted to a greater or lesser extent. By varying the different parameters of the optical layers, it is thus possible to obtain a transmission curve according to the wavelength having a determined profile. In the present case, the interference filters used transmit light in one or more narrow spectral bands centred on determined wavelengths. These bands have a width of a few tens of nanometers.

Figure 1:
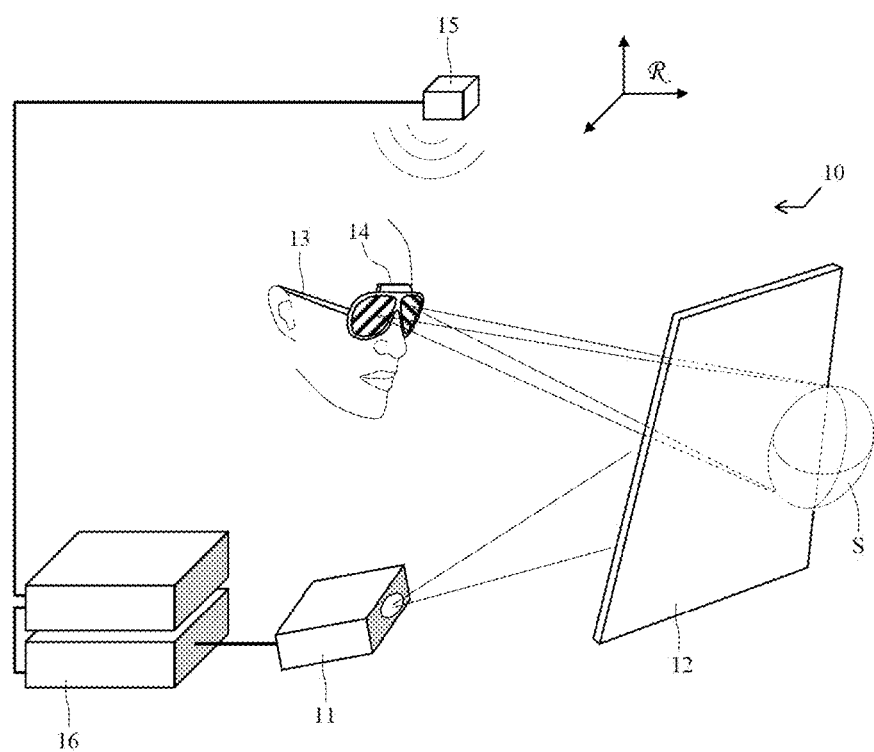
FIG. 1 shows an architecture for a visual display system according to the prior art.
Figure 2:
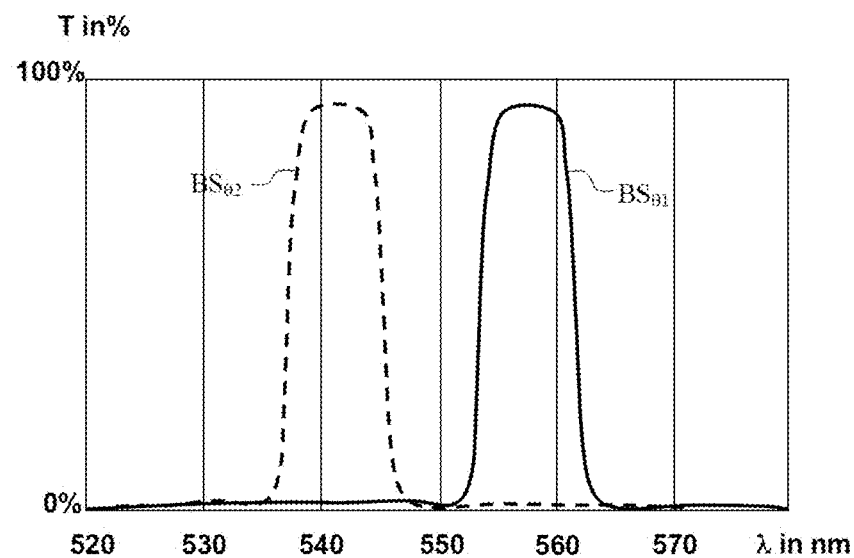
FIG. 2 shows the transmission band of an interference filter according to the wavelength for two different incidences.

It will be understood that the interference is dependent on phase shifts introduced by a reflection on the successive layers and therefore on the incidence of the ray of light. The transmission curves of the filters move towards low wavelengths when the incidence increases. Thus, the two curves in FIG. 2 show, for an interference filter transmitting a given spectral band, the evolution of the transmission T of this spectral band $BS_\theta$ according to the wavelength $\lambda$ for two different incidences $\theta 1$ and $\theta 2$. In the case of this figure, the wavelength is situated at the centre of the visible part of the spectrum around 550 nanometers. The transmission is normalized. If the incidence variation is sufficiently high, total separation of the two spectral bands $BS_{\theta 1}$ and $BS_{\theta 2}$ obtained at a first and a second incidence is possible, as can be seen in this FIG. 2.

Figure 3:
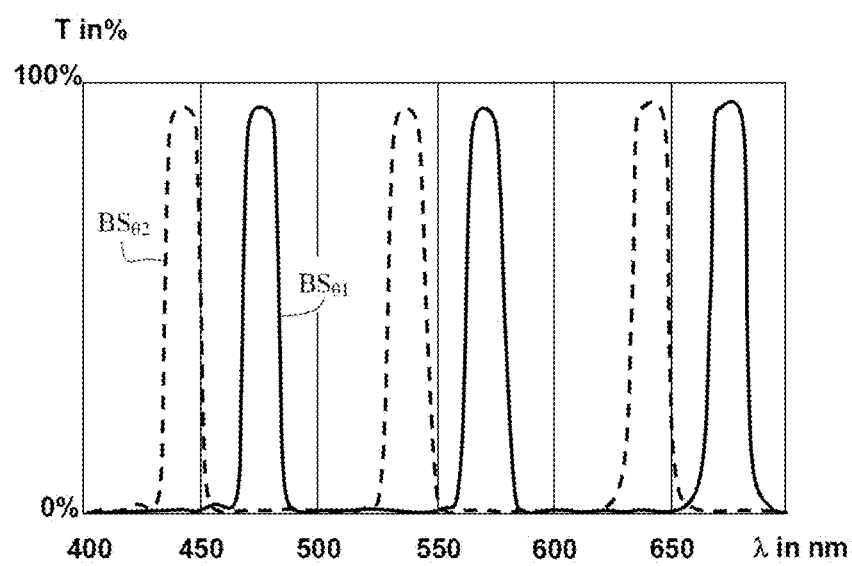
FIG. 3 shows the transmission of an interference filter having three transmission bands according to the wavelength for two different incidences.

FIG. 3 generalizes this property in the case of an interference filter transmitting three distinct spectral bands $BS_\theta$. It is possible, by changing the incidence from $\theta 1$ to $\theta 2$, to simultaneously shift these three first spectral bands $BS_{\theta 1}$ at a first incidence in order to obtain three second spectral bands $BS_{\theta 2}$ at a second incidence so that the second bands do not overlap the first spectral bands. In FIG. 3, the transmission T of the filter is given according to the wavelength $\lambda$ covering the whole visible spectrum, from 400 nanometers to 700 nanometers.

Figure 4:
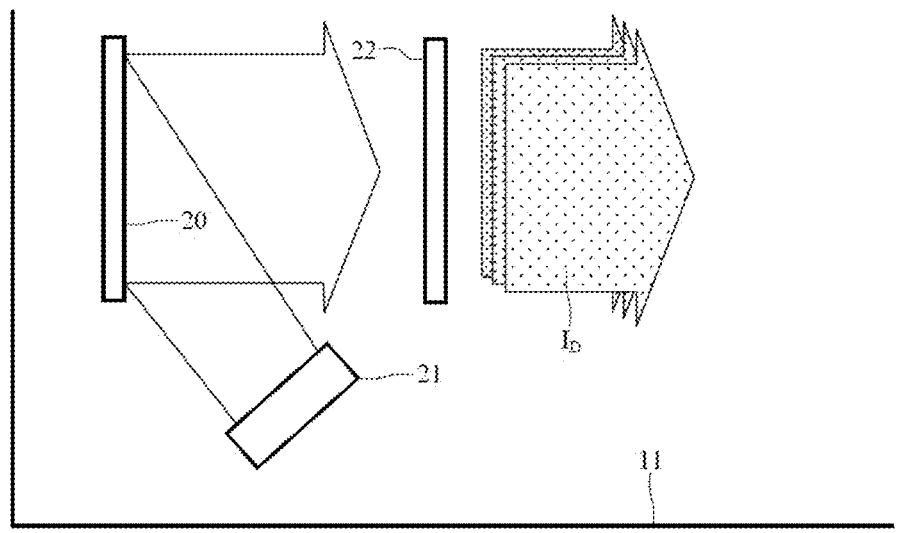
FIGS. 4 and 5 show the operation of the imager for two angular positions of the interference filter.
Figure 5:
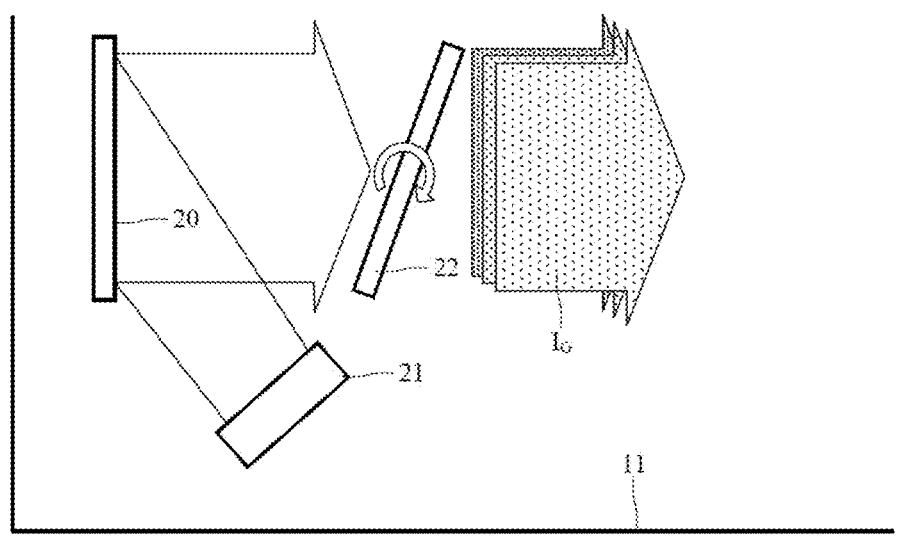

Thus, as illustrated in FIGS. 4 and 5, if such an interference filter 22 having three bands, according to the inclination of the interference filter, is arranged in front of a display 20 lit by a white source 21, this filter transmits either a first triplet $I_D$ of spectral bands or a second triplet $I_G$ of spectral bands, the two triplets $I_D$ and $I_G$ being totally separate. These triplets of spectral bands are symbolized by triplets of parallel arrows in FIGS. 4 and 5. By varying just the inclination of the interference filter, it is thus possible to obtain two spectrally separate coloured images. Generally, a variation of incidence of around 30 degrees for the filter is sufficient to separate the spectra in the visible region.

Figure 6:
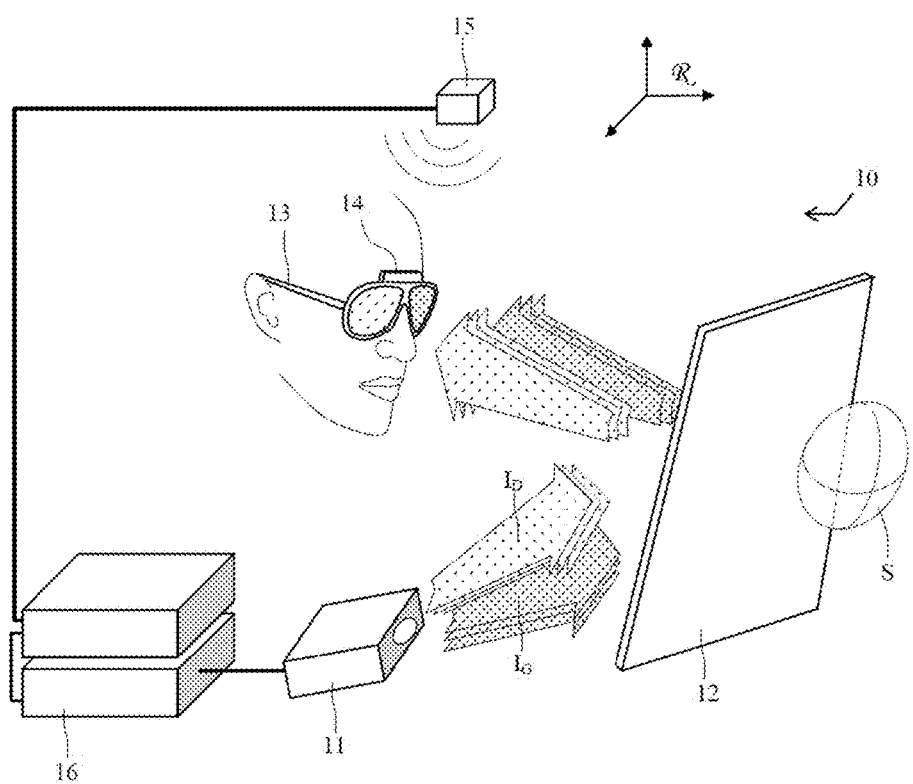
FIG. 6 shows an architecture for a visual display system according to the invention.

By way of example, a visual display system 10 having such a display 20 according to the invention is shown in FIG. 6. It has at least:

- a projector 11 for polychromic stereoscopic images;
- a semitransparent screen 12;
- a pair of stereoscopic spectacles 13 with spectral filters that is worn by the user.

The projector 11 has a high-resolution display and an interference filter with three spectral bands as defined above and a projection optical system having sufficient magnification to cover the semitransparent screen. The display, the interference filter and the projection optical system are not shown in this FIG. 6. For aeronautical applications, it is important that the maximum luminance of the display can be very high. By way of example, the display works through reflection of light and is of "DMD" type, the abbreviation standing for "Digital Micromirror Device".

The diameter of the interference filter is generally between 10 and 20 millimeters. The oscillation of the interference filter is controllable. The amplitude thereof is such that the filter allows the alternate passage, at a video speed, of the three first spectral bands and then the three second spectral bands.

The rotation of the filter is obtained by means of a mechatronic actuator that may be, by way of example, a rotary piezoelectric actuator, a micromotor, a stepping motor or a galvanometer or any other system providing this function of rotation at the desired speed. The change of angular position of the filter is typically made in less than 1 millisecond at a speed twice the video frequency. Thus, for a video frequency of 60 Hz, the frequency of change is 120 Hz. The angular course of the filter is programmable. The oscillator can have a rotational servocontrol or indexing device so that the angular range of rotation can vary according, by way of example, to the position of the spectacles of the user when the position of the spectacles is known to the visual display system by virtue of an appropriate detection system. This angular range can likewise be regulated according to the constraints of installation in an aircraft cockpit.

The semitransparent screen is an optical strip having both semitransparence for the outside landscape and distribution of the stereoscopic images. To this end, the surface of the projection screen can have a network of distributing patterns. The distribution by the screen is performed over a wide viewing angle, close to the half-space. A sizable field of view is thus obtained. "Field of view" is understood to mean the area of the space in which the image is visible. This solution likewise allows perfect control of the transparency of the screen. Thus, if the patterns cover only a limited percentage of the surface of the screen, the transmission of the screen is equal to unity less the percentage covered by the patterns. By way of example, if the patterns cover 20% of the surface, the transmission of the screen is close to 80%.

The operation of the visual display system is as follows. The display alternately displays two stereoscopic images $I_G$ and $I_D$ representing an object that is a sphere S in FIG. 6, the first image is transmitted by the interference filter rotated by a first incidence in the three first spectral bands, and the second image is transmitted by the interference filter rotated by a second incidence in the three second spectral bands, which are different from the three first spectral bands. These triplets of spectral bands are symbolized by triplets of parallel arrows in FIG. 6. By way of example, the three first spectral bands correspond to bright red, to yellowish green and to cyan blue and the three second spectral bands correspond to orange red, to cyan green and to royal blue. In both cases, these triplets can reconstruct a coloured image with depictions of the equivalent colours.

Figure 7:
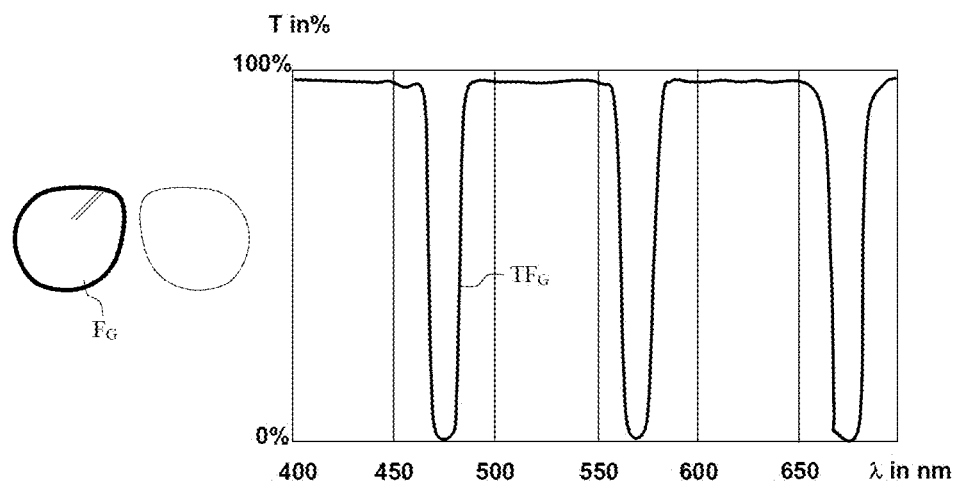
FIGS. 7 and 8 show the transmission of each lens of the pair of spectacles of the user.
Figure 8:
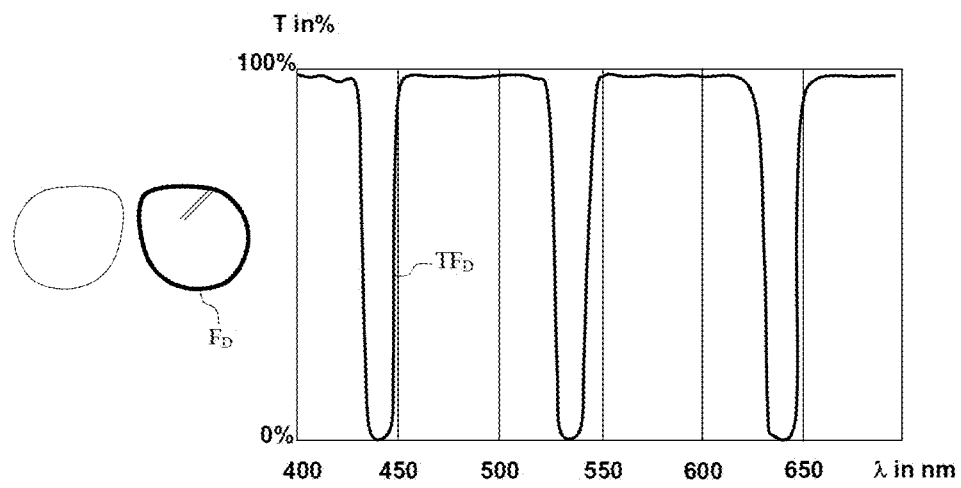

The pair of spectacles has a first filter $F_D$ arranged in front of the right eye and a second filter $F_G$ arranged in front of the left eye. FIGS. 7 and 8 show the respective transmissions $TF_G$ and $TF_D$ of each lens according to the wavelength $\lambda$ in nanometers. The first filter $F_D$ transmits the whole of the spectrum with the exception of the three second spectral bands and the second filter $F_G$ transmits the whole of the spectrum with the exception of the three first spectral bands.

Thus, the right eye can see only the first stereoscopic image and the right eye can see only the second stereoscopic image. The successive stereoscopic images have good separation and the stereoscopic illusion is restored. The user sees a merged image that is virtually positioned a certain distance from the visual display screen, this distance being able to be infinity for some applications. The object may be two-dimensional if it is a symbol, for example, or three-dimensional.

The system then allows the generation of objects in a very broad range of distances extending from infinity to very short distances from the user. Thus, the stereoscopic image can represent an object positioned in front of the semitransparent screen.

Another advantage of the system according to the invention is that it is possible to filter one of the wavelengths transmitted by consumer laser pointers in classes 3A, 3B and 4 so as to protect the user from these pointers. One possible solution is to add to the filters of the stereoscopic system an additional filter that blocks this wavelength. Another possible solution is to broaden the spectral bands so that the first spectral band of the first filter $F_G$ and the second spectral band of the second filter $F_D$ partially overlap, said wavelength $\lambda_L$ transmitted by a consumer laser pointer being situated in said area of overlap so as to be filtered by the first filter and by the second filter. With this latter solution, it is not necessary to add any specific filters.

The system according to the invention can have a system for detecting the position of the pair of spectacles. This type of detection conventionally has two subassemblies, as can be seen in FIG. 2, a first subassembly 14 fixed to the pair of spectacles and a second subassembly 15 arranged in a fixed reference frame. There are various techniques allowing an object to be located in space. It is possible to use electromagnetic detection. A transmitter is arranged in the fixed reference frame and a receiver in the mobile reference frame. It is likewise possible to use optical detection, which may be passive or active. In this latter case, the pair of spectacles carries light-emitting diodes from which the position of the transmission is located by cameras. All of these techniques are known to a person skilled in the art. They are compatible with real-time operation and are easily adapted to the visual display system according to the invention.

When the user moves his head, his movements are picked up by the detection means of the pair of spectacles. The electronic computer then recomputes the position of the stereoscopic images in real time so that the user continues to see the virtual image of the object in the same place. To take a simple example, if the virtual image of the object is at infinity, the Right Eye and Left Eye stereoscopic images are separated by a distance that is substantially equivalent to the mean distance between the pupils of a human being. Their movement on the visual display screen is substantially equal to that of the pair of spectacles. Thus, the sensation of an image at infinity is created.

As has been said, the system for detecting the position of the spectacles can likewise be used to servocontrol the angular range of rotation of the oscillator of the interference filter so that the transmission of the images by the spectacle lenses is constantly optimized, even if the user moves his head.

The technical applications of the visual display system according to the invention are mainly assistance in vehicle driving. The system according to the invention applies quite particularly to the field of aircraft cockpits in which the pilot needs to see the outside and simultaneously have information about flight behaviour or navigation of the aircraft. Application in the field of helicopters is of particular interest in so far as helicopters have sizable windows and are made to fly at low altitude.

What is claimed is:

1. A visual display system comprising an image generator for generating stereoscopic images of a predetermined object, a visual display device for said stereoscopic images comprising a projector for stereoscopic images and a semi-transparent screen; and a pair of stereoscopic spectacles, said projector comprising an imager, wherein:

the projector comprises:

a single interference filter arranged in front of the imager, the spectral transmission of which has at least one transmission band of determined width centred around a wavelength, said wavelength being dependent on the incidence of the light on said single interference filter, and;

a controllable actuator allowing the inclination of the single interference filter to be oscillated between two determined inclinations so as to transmit, for the first inclination, a first spectral band and, for the second inclination, a second spectral band;

the pair of stereoscopic spectacles having a first lens transmitting the first spectral band and blocking the second spectral band and the second lens transmitting the second spectral band and blocking the first spectral band.

2. The visual display system according to claim 1, wherein the projector comprises:

a single interference filter, the spectral transmission of which has three transmission bands of determined width centred around three wavelengths, said wavelengths being dependent on the incidence of the light on said single interference filter; and a controllable actuator allowing the inclination of the filter to be oscillated between two determined inclinations so as to transmit, for the first inclination, three first spectral bands and, for the second inclination, three second spectral bands;

the pair of stereoscopic spectacles having a first lens transmitting the three first spectral bands and blocking the three second spectral bands and a second lens transmitting the three second spectral bands and blocking the three first spectral bands.

3. The visual display system according to claim 1, wherein the determined inclination of the interference filter are programmable according to the constraints of set-up of the visual display system.

4. The visual display system according to claim 1, wherein the pair of spectacles has a filter that is common to the two lenses so that a wavelength situated in the area of overlap of said filter that is common to the two lenses is filtered by the first lens and by the second lens.

5. The visual display system according to claim 1, wherein the system comprises detectors for determining the relative position of the pair of spectacles in relation to the position of the semitransparent screen and a computer for computing the stereoscopic images so that the position of the stereoscopic image of the object is fixed in a predetermined reference frame and independent of the position of the stereoscopic spectacles.

6. The visual display system according to claim 5, wherein the projector comprises a servocontrol system so that the determined inclination of the interference filter are dependent on the relative position of the pair of spectacles in relation to the position of the semitransparent screen.

7. The visual display system according to claim 1, wherein the distance of the predetermined object from the user is between a few centimeters and optical infinity.

8. The visual display system according to claim 1, wherein the visual display system is an aircraft cockpit system.

* * * * *